US012571459B2

(12) United States Patent
Kaltenbach et al.

(10) Patent No.: US 12,571,459 B2
(45) Date of Patent: Mar. 10, 2026

(54) DRIVE UNIT FOR A VEHICLE

(71) Applicant: ZF Friedrichshafen AG, Friedrichshafen (DE)

(72) Inventors: Johannes Kaltenbach, Friedrichshafen (DE); Thomas Martin, Weissensberg (DE); Alexander Thorwart, Langenargen (DE); Michael Preuß, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/069,336

(22) Filed: Mar. 4, 2025

(65) Prior Publication Data

US 2025/0283529 A1 Sep. 11, 2025

(30) Foreign Application Priority Data

Mar. 5, 2024 (DE) ..................... 10 2024 202 033.8

(51) Int. Cl.
*B60K 17/08* (2006.01)
*B60K 1/02* (2006.01)
*F16H 37/08* (2006.01)

(52) U.S. Cl.
CPC ........... *F16H 37/0806* (2013.01); *B60K 1/02* (2013.01); *B60K 17/08* (2013.01);
(Continued)

(58) Field of Classification Search
CPC ......... F16H 37/0806; F16H 2200/0021; F16H 2200/0034; F16H 2200/0043;
(Continued)

(56) References Cited

U.S. PATENT DOCUMENTS 9,399,394 B2 7/2016 Kaltenbach et al.
11,181,174 B2 11/2021 Kim et al.
(Continued)

FOREIGN PATENT DOCUMENTS

CN 220009415 U 11/2023
DE 10 2013 214 238 1/2015
(Continued)

OTHER PUBLICATIONS

German Patent Office, German Search Report issued in German Patent application No. 10 2024 202 033.8 (Dec. 6, 2024).

*Primary Examiner* — Farhana Pervin
(74) *Attorney, Agent, or Firm* — Finch & Maloney PLLC

(57) ABSTRACT

A vehicle drive unit has a first and second electrical machines arranged in parallel, a manual gearbox arranged parallel to the electrical machines, a differential, a hollow drive shaft for connecting the first electrical machine to the gearbox, an output shaft within the drive shaft and for connecting the gearbox to the differential. A positive-locking shift unit has first and second shift elements and a sliding sleeve that is displaceable into three shift positions. In a first shift position, the first shift element is closed, and the second electrical machine is connected to the drive shaft with an actuating effect. In a second shift position, both shift elements are open, and the second electrical machine is decoupled from the gearbox. In a third shift position, the second shift element is closed, and the second electrical machine is connected to the output shaft with an actuating effect.

20 Claims, 9 Drawing Sheets

(52) U.S. Cl.
CPC ................ *F16H 2200/0021* (2013.01); *F16H 2200/0034* (2013.01); *F16H 2200/0043* (2013.01); *F16H 2200/2007* (2013.01); *F16H 2200/2094* (2013.01)

(58) Field of Classification Search
CPC ..... F16H 2200/2007; F16H 2200/2094; F16H 48/08; B60K 1/02; B60K 17/08; B60K 2007/0069
See application file for complete search history.

(56) References Cited

U.S. PATENT DOCUMENTS

| | | | | |
|---|---|---|---|---|
| 11,207,976 | B2 | 12/2021 | Ghatti et al. | |
| 2008/0202826 | A1* | 8/2008 | Freudenreich | B60K 17/08 180/6.5 |
| 2014/0349799 | A1* | 11/2014 | Kaltenbach | B60K 6/48 475/5 |
| 2017/0120739 | A1* | 5/2017 | Wagner | B60K 17/36 |
| 2024/0426368 | A1 | 12/2024 | Voelkel | |
| 2025/0043855 | A1* | 2/2025 | Waltz | B60K 1/02 |
| 2025/0144998 | A1* | 5/2025 | Cheng | F16H 57/037 |

FOREIGN PATENT DOCUMENTS

| | | |
|---|---|---|
| DE | 10 2022 201 321 | 8/2023 |
| DE | 10 2022 208 157 | 2/2024 |

* cited by examiner

DRIVE UNIT FOR A VEHICLE

RELATED APPLICATIONS

This application claims the benefit of and right of priority under 35 U.S.C. § 119 to German Patent Application no. 10 2024 202 033.8, filed on 5 Mar. 2024, the contents of which are incorporated herein by reference in its entirety.

FIELD OF THE DISCLOSURE

The invention relates to a drive unit for a vehicle, wherein the drive unit has two electrical machines, a manual gearbox with several gears, and a differential. The invention also relates to a vehicle with such a drive unit.

BACKGROUND

For example, DE 10 2013 214 238 A1 discloses a drive unit for a vehicle, wherein the drive unit has several electrical machines, at least one planetary gear train, and several positive-locking shifting elements. A first electrical machine is directly or indirectly, permanently coupled to a sun gear of a first planetary gear, wherein a second electrical machine is directly or indirectly coupled either to the sun gear of the first planetary gear or to a carrier of the first planetary gear, as a function of the shift position of a first positive-locking shift element and of a second positive-locking shift element. A hollow wheel of the first planetary gear is coupled either to a housing or to the web of the first planetary gear as a function of the shift position of a third positive-locking shift element and a fourth positive-locking shift element.

SUMMARY

The object of the present invention is to provide an alternative drive unit for a vehicle. In particular, the drive unit should be compact. The problem is solved by a drive unit with the features of independent patent claim 1. Advantageous embodiments are the subject of the dependent claims, the following description and the figures.

A drive unit for a vehicle according to the invention comprises a first electrical machine, a second electrical machine arranged axially parallel to the first, a manual gearbox with two gears arranged axially parallel to the two electrical machines, a differential with a differential input shaft and two differential output shafts, a drive shaft for connecting the first electrical machine to the manual gearbox, an output shaft for connecting the manual gearbox to the differential, and a first positive-locking shift unit having a first shift element, a second shift element, and a first sliding sleeve, which is displaceable by means of a first actuator into a respective one of three shift positions, wherein in a first shift position of the first sliding sleeve the first shift element is closed and the second electrical machine is connected with an actuating effect to the drive shaft, wherein in a second shift position of the first sliding sleeve both shift elements are open and the second electrical machine is decoupled from the manual gearbox, wherein in a third shift position of the first sliding sleeve, the second shift element is closed and the second electrical machine is connected to the output shaft with an actuating effect, wherein the drive shaft is designed as a hollow shaft and the output shaft is arranged within the drive shaft. Furthermore, the output shaft is guided axially through the entire drive shaft, which makes the drive unit particularly compact.

A "shift element" is a shiftable device which, in a closed state, connects two shafts or a shaft and a housing to each other in a rotationally fixed manner and, in an open state, decouples the two shafts or the shaft and the stationary component from each other. Two shafts can then rotate relative to each other. For the purposes of the invention, a "shaft" is to be understood as a rotatable component of the transmission, via which associated components of the transmission are connected to each other in a rotationally fixed manner or via which such a connection can be established when one of the shift elements is actuated. The respective shaft can connect the components axially or radially or both axially and radially. The respective shaft can also be present as an intermediate piece, via which a respective component is connected radially, for example. The term "shaft" does not exclude the possibility that the components to be connected may be designed in one piece. In particular, two or more shafts connected to each other in a rotationally fixed manner can be designed in one piece.

The first shift unit has a neutral position between two gear positions, so that two gear positions and one neutral position are provided for three shift positions. In a neutral position, two shafts are decoupled from each other by the first shift unit, wherein the first sliding sleeve is then in a rotary engagement with a single shaft. In particular, the first actuator moves the first sliding sleeve to the first shift position, thereby coupling the second electrical machine to the manual gearbox and the differential. The first sliding sleeve is designed to be positive-locking and has positive-locking claws that interact positively in the respective gear position with a respective corresponding claw toothing in order to set a rotationally fixed connection between two shafts. The respective claw toothing, with which the first sliding sleeve interacts in a positive-locking manner, is therefore to be understood as a shift element. Preferably, the first shift unit comprises an unsynchronized claw clutch. This means that both shift elements are designed as positive-locking shift elements. Positive-locking shift elements can increase the efficiency of the drive unit due to reduced drag losses. In particular, positive-locking shift elements are more compact and efficiency-optimized and have a cost advantage over friction-locking shift elements. The use of a single sliding sleeve and a single actuator to shift the first and second shift elements further increases the compactness.

The second electrical machine can use the two gears of the manual gearbox by connecting to the drive shaft. To do this, the first shift element is closed. The second electrical machine can drive directly onto the output shaft independently of the first electrical machine when the second shift element is closed.

When the first shift element is closed, i.e. in the first shift position of the first sliding sleeve, the second electrical machine is connected to the drive shaft with an actuating effect, wherein a torque summation of the two electrical machines is thereby made possible, wherein both electrical machines have the two gears of the manual gearbox.

In the open state of the first and second shift element, i.e. in the second shift position or Neutral position of the first sliding sleeve, the second electrical machine is decoupled from the drive train, whereby, for example in a partial load operation, electrical losses as well as losses can be reduced by rotating bearings.

When the second shift element is closed, i.e. in the second shift position of the first sliding sleeve, the second electrical machine is connected to the output shaft with an actuating effect, whereby drive power can be introduced into the manual gearbox via a second path. In this way, the second electrical machine can drive the vehicle independently of the first electrical machine and support the tensile force during the shifting of the first electrical machine. This is generally known as "output-supported shifting" or "electromotive shifting" (EMS).

According to one embodiment, the first electrical machine is connected to the drive shaft via a first spur gear stage, wherein the second electrical machine is connectable to the drive shaft or to the output shaft via a second spur gear stage. In particular, the first spur gear stage has a first spur gear and a second spur gear that engage in a tooth mesh with each other. The first spur gear is connected in a rotationally fixed manner, for example, to a rotor shaft of the first electrical machine, wherein the second spur gear is connected in a rotationally fixed manner to the drive shaft. In particular, the second spur gear stage has a third spur gear and a fourth spur gear, which engage in a tooth mesh with each other. The third spur gear, for example, is connected in a rotationally fixed manner to a rotor shaft of the second electrical machine, wherein the fourth spur gear can be connected in a rotationally fixed manner to the drive shaft or to the output shaft via the first shift unit. Reference is made to the embodiment shown in FIG. 5.

According to one embodiment, the first electrical machine is connected to the drive shaft via a first spur gear stage and a second spur gear stage, wherein the second electrical machine can be connected to the drive shaft or to the output shaft via a third spur gear stage and a fourth spur gear stage. In particular, the first spur gear stage comprises a first spur gear and a second spur gear that engage in a tooth mesh. Furthermore, the second spur gear stage has a third spur gear and a fourth spur gear, which are engaged in a tooth mesh with each other. The first spur gear is connected in a rotationally fixed manner, for example, to a rotor shaft of the first electrical machine, wherein the second and third spur gears are connected in a rotationally fixed manner, wherein the fourth spur gear is connected in a rotationally fixed manner to the drive shaft. In particular, the third spur gear stage has a fifth spur gear and a sixth spur gear that engage in a tooth mesh with each other. Furthermore, the fourth spur gear stage has a seventh spur gear and an eighth spur gear that engage in a tooth mesh with each other. The fifth spur gear, for example, is connected in a rotationally fixed manner to a rotor shaft of the second electrical machine, wherein the sixth and seventh spur gears are connected in a rotationally fixed manner, wherein the eighth spur gear can be connected in a rotationally fixed manner to the drive shaft or to the output shaft via the first shift unit. In this context, reference is made to the embodiments shown in FIG. 2 to FIG. 4 and FIG. 6 to FIG. 10.

According to one embodiment, the first shift unit is arranged radially nested with the first spur gear stage and the third spur gear stage. In particular, the first spur gear stage and the second spur gear stage are radially nested on an outer circumference of the first shift unit in order to save axial space. Consequently, the first shift unit, the first spur gear stage and the second spur gear stage are at least partially located in the same axial plane. Reference is made to the embodiments according to FIG. 2 to FIG. 4 and FIG. 7 to FIG. 10.

According to one embodiment, the manual gearbox comprises a first planetary gear set having a first sun shaft, a first hollow gear shaft, a first web shaft, and a second planetary gear set having a second sun shaft, a second hollow gear shaft, and a second web shaft, wherein the first sun shaft, the second sun shaft, and the drive shaft are connected in a rotationally fixed manner, wherein the first web shaft and the second hollow gear shaft are connected in a rotationally fixed manner, wherein the second web shaft and the output shaft are connected in a rotationally fixed manner. Consequently, the manual gearbox has two planetary gear sets, wherein these are axially adjacent to one another in order to save radial space. The first web shaft carries multiple planetary gears which mesh with the first sun shaft and with the first hollow gear shaft, i.e., engage in a tooth mesh. The second web shaft carries several planetary gears that mesh with the second sun shaft and the second hollow gear shaft. In this context, reference is made to the embodiments according to FIG. 2, FIG. 3 and FIG. 5 to FIG. 7.

According to one embodiment, the manual gearbox comprises a third shift element and a fourth shift element, wherein in a closed state of the third shift element, the first hollow gear shaft is connected to a stationary component in a rotationally fixed manner, wherein in a closed state of the fourth shift element, the two planetary gear sets are blocked. A "stationary component" is a component that is fixed in a stationary position, in particular is connected to a housing or part of a housing in a rotationally fixed or integral manner. To lock the two planetary gear sets, two of the three shafts of the respective planetary gear set can be connected to each other or a shaft of the first planetary gear set can be connected to a shaft of the second planetary gear set. When a planetary gear set is blocked, it rotates in the block. For example, when the fourth shift element is in a closed state, the first hollow gear shaft, the second hollow gear shaft and the first web shaft are connected in a rotationally fixed manner. Reference is made to the embodiments according to FIG. 2 and FIG. 5 to FIG. 7.

According to one embodiment, the manual gearbox comprises a third shift element and a fourth shift element, wherein, in a closed state of the third shift element, the second hollow gear shaft and the first web shaft are connected to a stationary component in a rotationally fixed manner, wherein, in a closed state of the fourth shift element, the first hollow gear shaft is connected to a stationary component in a rotationally fixed manner. Reference is made to the embodiment shown in FIG. 3.

According to one embodiment, the manual gearbox has a planetary gear set with a sun shaft, a hollow gear shaft and a web shaft, as well as a third shift element and a fourth shift element, wherein the sun shaft and the drive shaft are connected in a rotationally fixed manner, wherein the web shaft and the output shaft are connected in a rotationally fixed manner, wherein, in a closed state of the third shift element, the hollow gear shaft is connected in a rotationally fixed manner to a stationary component, wherein, in a closed state of the fourth shift element, the hollow gear shaft, the sun shaft and the drive shaft are connected in a rotationally fixed manner. The first web shaft carries multiple planetary gears which mesh with the first sun shaft and with the first hollow gear shaft, i.e., engage in a tooth mesh. Reference is made to the embodiment shown in FIG. 4.

According to one embodiment, the manual gearbox comprises a first planetary gear set with a first sun shaft, a first hollow gear shaft, a first web shaft, a second planetary gear set with a second sun shaft, a second hollow gear shaft, and a second web shaft, as well as a third shift element and a fourth shift element, wherein the first sun shaft, the second sun shaft, and the drive shaft are connected in a rotationally fixed manner, wherein the first web shaft and the second hollow gear shaft are connected in a rotationally fixed manner, wherein the first hollow gear shaft is connected in a rotationally fixed manner to a stationary component, wherein, in a closed state of the third shift element, the second web shaft and the output shaft are connected in a rotationally fixed manner, wherein, in a closed state of the fourth shift element, the first sun shaft, the second sun shaft, the drive shaft and the output shaft are connected in a rotationally fixed manner. The first web shaft carries multiple planetary gears which mesh with the first sun shaft and with the first hollow gear shaft, i.e., engage in a tooth mesh. The second web shaft carries several planetary gears that mesh with the second sun shaft and the second hollow gear shaft. Reference is made to the embodiment shown in FIG. 8.

According to one embodiment, the manual gearbox comprises a first planetary gear set having a first sun shaft, a first hollow gear shaft, and a first web shaft, a second planetary gear set having a second sun shaft, a second hollow gear shaft and a second web shaft, and a third shift element and a fourth shift element, wherein the first sun shaft, the second sun shaft and the drive shaft are connected in a rotationally fixed manner, wherein the first web shaft and the second hollow gear shaft are connected in a rotationally fixed manner, wherein the first hollow gear shaft is connected in a rotationally fixed manner to a stationary component, wherein, in a closed state of the third shift element, the first web shaft, the second hollow gear shaft and the output shaft are connected in a rotationally fixed manner, wherein, in a closed state of the fourth shift element, the second web shaft and the output shaft are connected in a rotationally fixed manner. The first web shaft carries multiple planetary gears which mesh with the first sun shaft and with the first hollow gear shaft, i.e., engage in a tooth mesh. The second web shaft carries several planetary gears that mesh with the second sun shaft and the second hollow gear shaft. Reference is made to the embodiment shown in FIG. 9.

According to one embodiment, the manual gearbox includes a stepped planetary gear set having a first sun shaft, a second sun shaft, a hollow gear shaft and a web shaft, with a plurality of stepped planet gears, each having a first and a second gear wheel connected in a rotationally fixed manner, as well as a third shift element and a fourth shift element, wherein the first gear wheel is in a tooth mesh with the first sun shaft and the hollow gear shaft, wherein the second gear wheel is in tooth mesh with the second sun shaft, wherein the hollow gear shaft is connected to a stationary component in a rotationally fixed manner, wherein in a closed state of the third shift element the web shaft and the output shaft are connected in a rotationally fixed manner, wherein in a closed state of the fourth shift element the second sun shaft and the output shaft are connected in a rotationally fixed manner. Reference is made to the embodiment shown in FIG. 10.

The third and fourth shift elements are designed as gear shift elements and are thus set up to shift gears. When the third shift element is closed and the fourth shift element is open, first gear is engaged with a first transmission ratio. When the fourth shift element is closed and the third shift element is open, a second gear is engaged with a second transmission ratio.

According to one embodiment, the third and fourth shift elements form a second shift unit with three shift positions and a second sliding sleeve. The second shift unit has a neutral position between two gear positions, so that with three shift positions, two gear positions and one neutral position are provided. In a neutral position, two shafts or a shaft and a stationary component are decoupled from one another by the second shift unit, wherein the second sliding sleeve is then in a rotary engagement with a single shaft or with the stationary component. In particular, a second actuator moves the second sliding sleeve into the respective shift position and thereby shifts two gears, wherein precisely one shift element of the second shift unit is closed to realize one gear. The second sliding sleeve is designed to be positive-locking and has positive-locking claws which, in the respective gear position, interact in a positive-locking manner with a respective corresponding claw toothing in order to set up a rotationally fixed connection between two shafts or a shaft and a stationary component. Consequently, the respective claw toothing with which the second sliding sleeve interacts in a positive-locking manner is to be understood as a shift element. Preferably, the second shift unit comprises an unsynchronized claw clutch. This means that all shift elements are designed as positive-locking shift elements. The efficiency of the manual gearbox can be increased by means of positive-locking shift elements due to reduced drag losses. In particular, positive-locking shift elements are more compact and efficiency-optimized and have a cost advantage over friction-locking shift elements. The use of a single sliding sleeve to shift two gears further increases compactness, wherein only a single actuator is needed.

According to one embodiment, the differential is arranged coaxially with the manual gearbox, wherein the third differential output shaft is guided axially through the output shaft. Preferably, the differential input shaft is connected to the output shaft in a rotationally fixed manner. This makes the drive unit particularly compact. Reference is made to the embodiments according to FIG. 2 to FIG. 6 and FIG. 8 to FIG. 10.

According to a preferred embodiment, the differential is designed as a ball or bevel gear differential. A differential designed as a ball or bevel gear differential has two output elements on the wheel side, in particular a first output gear and a second output gear. The two output gears each mesh with a balancing element. The balancing elements are mounted in a differential cage so that they can rotate about their own axle. The respective output gear is connected to the respective differential output shaft in a rotationally fixed manner. The differential is driven via the differential cage, which is configured as a differential input shaft. Furthermore, alternative forms of differential training are also conceivable, for example as a spur gear differential or planetary differential. The drive power fed into the differential via the differential input shaft is distributed in the usual way between the two differential output shafts and transmitted to the axle's drive wheels. The differential output shafts are configured to be connected to the drive gears of the vehicle with an actuating effect. The respective differential output shaft can be connected directly or indirectly or indirectly via a downstream fixed transmission ratio, a joint, a drive shaft and/or a wheel hub to the associated vehicle wheel.

According to one embodiment, the differential is arranged transversely to the manual gearbox, wherein the differential input shaft is connected to the output shaft via a bevel gear stage. Reference is made to the embodiment shown in FIG. 7.

A vehicle according to the invention comprises one drive unit according to the invention. The above definitions and explanations of technical effects, advantages and advantageous embodiments of the drive unit according to the invention also apply mutatis mutandis to the vehicle according to the invention.

BRIEF DESCRIPTION OF THE DRAWINGS

Advantageous embodiments of the invention, which are explained below, are shown in the drawings, wherein identical or similar elements are provided with the same reference numerals. It shows.

DETAILED DESCRIPTION

Figure 1:
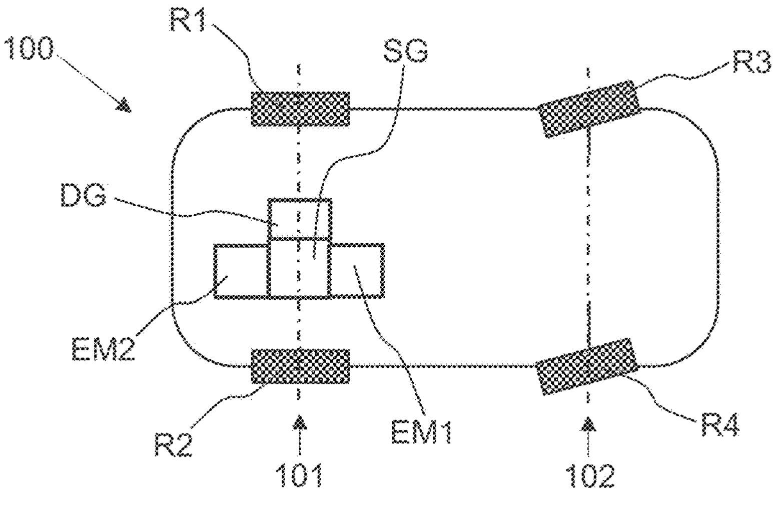
FIG. 1: a highly abstract schematic view of a vehicle with a drive axle, which has a drive unit according to the invention.
Figure 2:
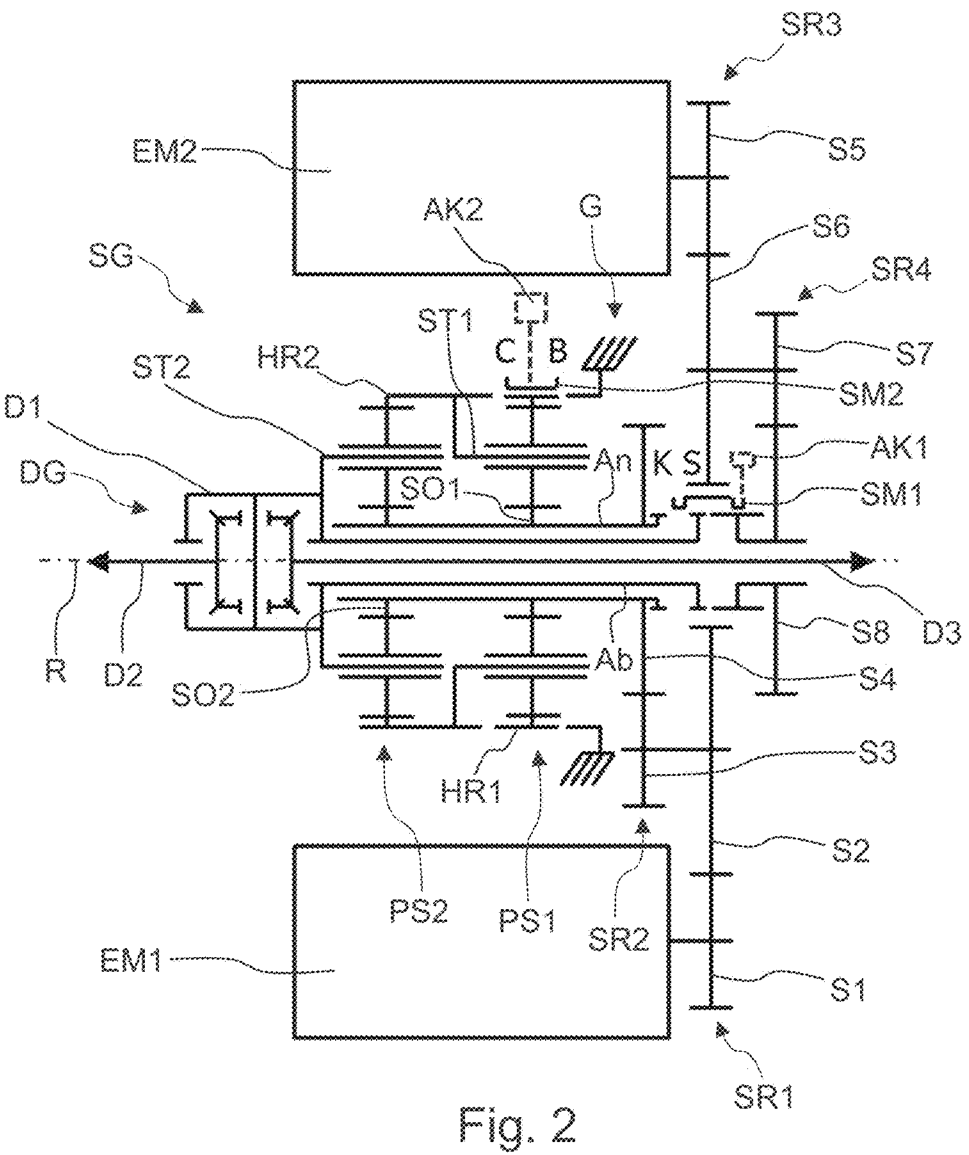
FIG. 2: a highly abstract schematic view of a drive unit according to the invention in accordance with a first embodiment.

FIG. 1 shows a vehicle 100 with a first axle 101 with two vehicle wheels R1, R2 and a second axle 102 with two vehicle wheels R3, R4. In the present case, the first axle 101 is designed as the rear drive axle of the vehicle 100 and is equipped with a drive unit according to the invention. The drive unit includes a first and a second electrical machine EM1, EM2, each of which is designed to generate a drive power, a manual gearbox SG with two gears and a differential DG. The vehicle 100 is therefore designed as an electric vehicle, i.e. a vehicle that can be driven electrically. The drive unit is arranged transversely to the longitudinal direction of the vehicle and is connected to the vehicle wheels R1, R2 of the first axle 101 with an actuating effect. A detailed embodiment of this drive unit is shown in FIG. 2. Alternatively, as shown in more detail in FIG. 7, the differential DG can be arranged transversely to the longitudinal direction of the vehicle.

In the present case, no further drive unit is arranged on the second axle 102, i.e. on the front axle of the vehicle 100, which saves costs, weight and installation space. Alternatively, the drive unit can be arranged on the front axle of the vehicle 100 instead of the rear axle. To implement an all-wheel drive system, a further drive unit can be arranged on the second axle 102 and connected to the vehicle wheels R3, R4 of this axle 102 with an actuating effect.

FIG. 2 shows the drive unit according to a first embodiment. The drive unit comprises a drive shaft An for connecting the first electrical machine EM1 to the manual gearbox SG, an output shaft Ab for connecting the manual gearbox SG to the differential DG and a first positive-locking shift unit having a first shift element K, a second shift element S and a first sliding sleeve SM1, which is displaceable by means of a first actuator AK1 into a respective one of three shift positions. The drive shaft An is designed as a hollow shaft and the output shaft Ab is arranged within the drive shaft An, whereby the drive unit is particularly compact in design. The differential DG has a differential input shaft D1 and two differential output shafts D2, D3, wherein the differential DG is arranged coaxially with the manual gearbox SG and the third differential output shaft D3 is guided axially through the output shaft Ab, thereby making the drive unit even more compact. The differential input shaft D1 is connected to the output shaft Ab in a rotationally fixed manner.

The differential DG is designed as a ball or bevel gear differential. The differential input shaft D1 is designed as a differential cage. A differential designed as a bevel gear differential DG has two output elements on the wheel side, in particular a first output gear and a second output gear. The two output gears each mesh with a balancing element. The balancing elements are mounted in the differential cage so that they can rotate about their own axle. The respective output gear is connected to the respective differential output shaft D2, D3 in a rotationally fixed manner. Consequently, the differential DG is driven via the differential cage, which is connected to the output shaft Ab in a rotationally fixed manner. Arrows on the differential output shafts D2, D3 indicate a connection to a respective vehicle wheel of this vehicle axle.

The first electrical machine EM1 is connected to the drive shaft An via a first spur gear stage SR1 and a second spur gear stage SR2. In the present case, the first spur gear stage SR1 has a first spur gear S1 and a second spur gear S2, which are engaged in a tooth mesh with each other. Furthermore, the second spur gear stage SR2 has a third spur gear S3 and a fourth spur gear S4, which are engaged in a tooth mesh with each other. The first spur gear S1 is connected in a rotationally fixed manner to a rotor shaft of the first electrical machine EM1, wherein the second and the third spur gears S2, S3 are connected in a rotationally fixed manner, wherein the fourth spur gear S4 is connected to the drive shaft An in a rotationally fixed manner.

The second electrical machine EM2 can be connected to the drive shaft An or the output shaft Ab via the third spur gear stage SR3 and the fourth spur gear stage SR4. Furthermore, the third spur gear stage SR3 has a fifth spur gear S5 and a sixth spur gear S6, which are engaged in a tooth mesh with each other. The fourth spur gear stage SR4 has a seventh spur gear S7 and an eighth spur gear S8, which are engaged in a tooth mesh with each other. The fifth spur gear S5 is connected in a rotationally fixed manner to a rotor shaft of the second electrical machine EM2, wherein the sixth and seventh spur gears S6, S7 are connected in a rotationally fixed manner, wherein the eighth spur gear S8 can be connected in a rotationally fixed manner to the drive shaft An or to the output shaft Ab via the first shift unit. When the first shift element K is closed, the eighth spur gear S8 is connected to the drive shaft An in a rotationally fixed manner. When the second shift element S is closed, the eighth spur gear S8 is connected to the output shaft Ab in a rotationally fixed manner. The first shift unit is arranged radially nested with the first spur gear stage SR1 and the third spur gear stage SR3 in order to save axial space.

The drive shaft An, the output shaft Ab, the manual gearbox SG and the differential DG are arranged on a common axis of rotation R and are thus coaxial to one another. The two electrical machines EM1, EM2 are arranged axially parallel to the axis of rotation R. In accordance with an axial sequence, the second planetary gear set PS2 is arranged axially adjacent to the differential DG, wherein the first planetary gear set PS1 is arranged axially adjacent to the second planetary gear set PS2, wherein the second spur gear stage SR2 is arranged axially adjacent to the first planetary gear set PS1, wherein the first shift unit is arranged axially adjacent to the first spur gear stage SR1, wherein the fourth spur gear stage SR4 is arranged axially adjacent to the first shift unit.

In a first shift position of the first sliding sleeve SM1, the first shift element K is closed and the second electrical machine EM2 is connected to the drive shaft An with an actuating effect. In a second shift position of the first sliding sleeve SM1, both shift elements K, S are open, wherein the second electrical machine EM2 is thereby decoupled from the manual gearbox SG. This second shift position of the first sliding sleeve SM1 is shown in FIG. 2. In a third shift position of the first sliding sleeve SM1, the second shift element S is closed and the second electrical machine EM2 is connected to the output shaft Ab with an actuating effect.

The manual gearbox SG has a first planetary gear set PS1, a second planetary gear set PS2, a third shift element B and a fourth shift element C. The two planetary gear sets PS1 and PS2 are arranged axially adjacent to one another in order to save space and increase compactness. The first planetary gear set PS1 comprises three shafts, namely a first sun shaft SO1, a first hollow gear shaft HR1 and a first web shaft ST1. The first web shaft ST1 carries multiple planetary gears which mesh with the first sun shaft SO1 and with the first hollow gear shaft HR1, i.e., engage in a tooth mesh. The second planetary gear set PS2 also comprises three shafts, namely a second sun shaft SO2, a second hollow gear shaft HR2, and a second web shaft ST2. The second web shaft ST2 carries several planetary gears that mesh with the second sun shaft SO2 and the second hollow gear shaft HR2.

The first sun shaft SO1, the second sun shaft SO2 and the drive shaft An are connected in a rotationally fixed manner. The first web shaft ST1 and the second hollow gear shaft HR2 are connected in a rotationally fixed manner. The second web shaft ST2 and the output shaft Ab are connected in a rotationally fixed manner. When the third shift element B is in a closed state, the first hollow gear shaft HR1 is connected in a rotationally fixed manner to a stationary component designed as a housing G. When the fourth shift element C is closed, the two planetary gear sets PS1, PS2 are blocked, wherein in the present case the second hollow gear shaft HR2 and the first web shaft ST1 are connected to the first hollow gear shaft HR1 in a rotationally fixed manner.

The third shift element B and the fourth shift element C are combined to form a second shift unit with a second sliding sleeve SM2 and three shift positions, namely two gear positions and a neutral position. The second sliding sleeve SM2 is arranged in a radially nested fashion on the outer circumference of the first planetary gear set PS1 in order to save axial space and thus increase axial compactness. The neutral position is located between the two gear positions. The three shift positions are realized by axially displacing the second sliding sleeve SM2. The second sliding sleeve SM2 has claw switching elements and is axially displaceable into the respective shift position by means of a second actuator AK2. All three shift positions of the second shift unit are arranged linearly. The two gears are shifted sequentially by moving the second sliding sleeve SM2 in an axial direction, past the neutral position. This not only saves weight and components, but also costs, installation space, and assembly work.

When the third shift element B is closed, a first gear is engaged with a first transmission ratio, wherein in the first gear the first hollow gear shaft HR1 is connected in a rotationally fixed manner to the stationary component designed as the housing G. When the fourth shift element C is closed, a second gear is engaged with a second transmission ratio, wherein in the second gear the first hollow gear shaft HR1 is connected to the first web shaft ST1 and the second hollow gear shaft HR2 in a rotationally fixed manner.

First gear is engaged when the second sliding sleeve SM2 is in a first gear position, i.e., in a first shift position. The third shift element B connects the first hollow gear shaft HR1 to the stationary component in order to shift the first gear in an actuated or closed state, i.e. in the first shift position of the second sliding sleeve SM2.

The first gear is selected by moving the second sliding sleeve SM2 axially into the neutral position, i.e., into a second shift position. In the second shift position of the second sliding sleeve SM2, the second sliding sleeve SM2 is only in a rotary engagement with the first hollow gear shaft HR1. In this neutral position, the shift elements B, C are open. This second shift position of the second sliding sleeve SM2 is shown in FIG. 2.

The second gear is engaged by moving the second sliding sleeve SM2 axially into a second gear position, i.e., into a third shift position. The fourth shift element C connects the first hollow gear shaft HR1 to the first web shaft ST1 and the second hollow gear shaft HR2 in an actuated or closed state, i.e. in the third shift position of the second sliding sleeve SM2, in order to shift to second gear.

The second electrical machine EM2 can be connected to the two gears of the manual gearbox SG by connecting it to the drive shaft An. To do this, the first shift element K is closed. The second electrical machine EM2 can drive directly onto the output shaft Ab independently of the first electrical machine EM1 when the second shift element S is closed.

When the first shift element K is closed, i.e. in the first shift position of the first sliding sleeve, the second electrical machine EM2 is connected to the drive shaft An with an actuating effect, wherein a torque summation of the two electrical machines EM1, EM2 is thereby made possible, wherein both electrical machines EM1, EM2 have the two gears of the manual gearbox SG.

When the first and second shift elements K, S are in the open state, i.e. in the second shift position or neutral position of the first sliding sleeve SM, the second electrical machine EM2 is decoupled from the drive train, which means that, for example in a partial-load operation, electrical losses as well as losses due to bearings rotating with the shaft can be reduced.

When the second shift element S is closed, i.e. in the second shift position of the first sliding sleeve SM1, the second electrical machine EM2 is connected with an actuating effect to the output shaft Ab, whereby drive power can be introduced into the manual gearbox SG via a second path. In this way, the second electrical machine EM2 can drive the vehicle independently of the first electrical machine EM1 and support the tensile force during the shifting of the first electrical machine EM1. This is a so-called “output-assisted shifting” or “electromotive shifting” (EMS).

The transmission ratio for the second electrical machine EM2 (direct drive) to support the gearshift corresponds to the second gear (locking of the two planetary gear sets PS1, PS2). During the re-coupling of the second electrical machine EM2, i.e. the changeover at the first and second shift element K, S, the first electrical machine EM1 can support the tensile force. The manual gearbox SG is thus load-switchable because one of the two electrical machines EM1, EM2 can always support the tensile force. When the second shift element S is closed and the third and fourth shift elements B, C are open, the second electrical machine EM2 can drive in second gear and the first electrical machine EM1 is decoupled from the drive train so that it cannot contribute any drive power to the drive train. However, the two planetary gear sets PS1, PS2 then rotate without load. Therefore, for reasons of efficiency, decoupling of the second electrical machine EM2 via the first shift unit is to be preferred. In general, however, either the first electrical machine EM1 or the second electrical machine EM2 can be decoupled. This is preferably done in the partial load range.

For the decoupling strategy, it is proposed to decouple the electrical machine EM1 or EM2 whose temperature (or the temperature of the associated inverter) is higher or whose operating point is less efficient. This also allows alternating operation of the electrical machines EM1 and EM2. If none of the four shift elements K, S, B, C is closed, as shown in the illustration, both electrical machines EM1, EM2 are decoupled from the drive train. This enables a “sailing mode” for the vehicle, for example.

In the power-shift process, the first electrical machine EM1 is assumed to be the main drive machine, since the first electrical machine EM1 is firmly connected to the drive shaft An. To support the shifting process, the second electrical machine EM2 is decoupled from the output shaft Ab, wherein the second shift element S is closed.

When, for example, the gear is shifted from first to second gear, the third shift element B is opened, and the fourth shift element C is closed. In the event that the second electrical machine EM2 is connected to the drive shaft An and thus both electrical machines EM1, EM2 drive together, the load on the second electrical machine EM2 is first reduced, then the first shift element K is opened, then the second electrical machine EM2 synchronizes the second shift element S and closes this shift element S. The second electrical machine EM2 is then connected to the output shaft Ab. The second electrical machine EM2 takes over the load by building up torque at the second electrical machine EM2 while simultaneously reducing torque at the first electrical machine EM1, so that the third shift element B is relieved. To open the third shift element B, the first electrical machine EM1 actively synchronizes the fourth shift element C. As soon as the shift element C is in sync, the fourth shift element C is closed. The torques of the two electrical machines EM1, EM2 can now be distributed as desired, since a fixed gear is engaged for the first electrical machine EM1. After the shift, the second electrical machine EM2 can be reconnected to the drive shaft An, depending on the operating strategy. This is done by moving the first sliding sleeve SM1, i.e. by opening the second shift element S and closing the first shift element K.

Figure 3:
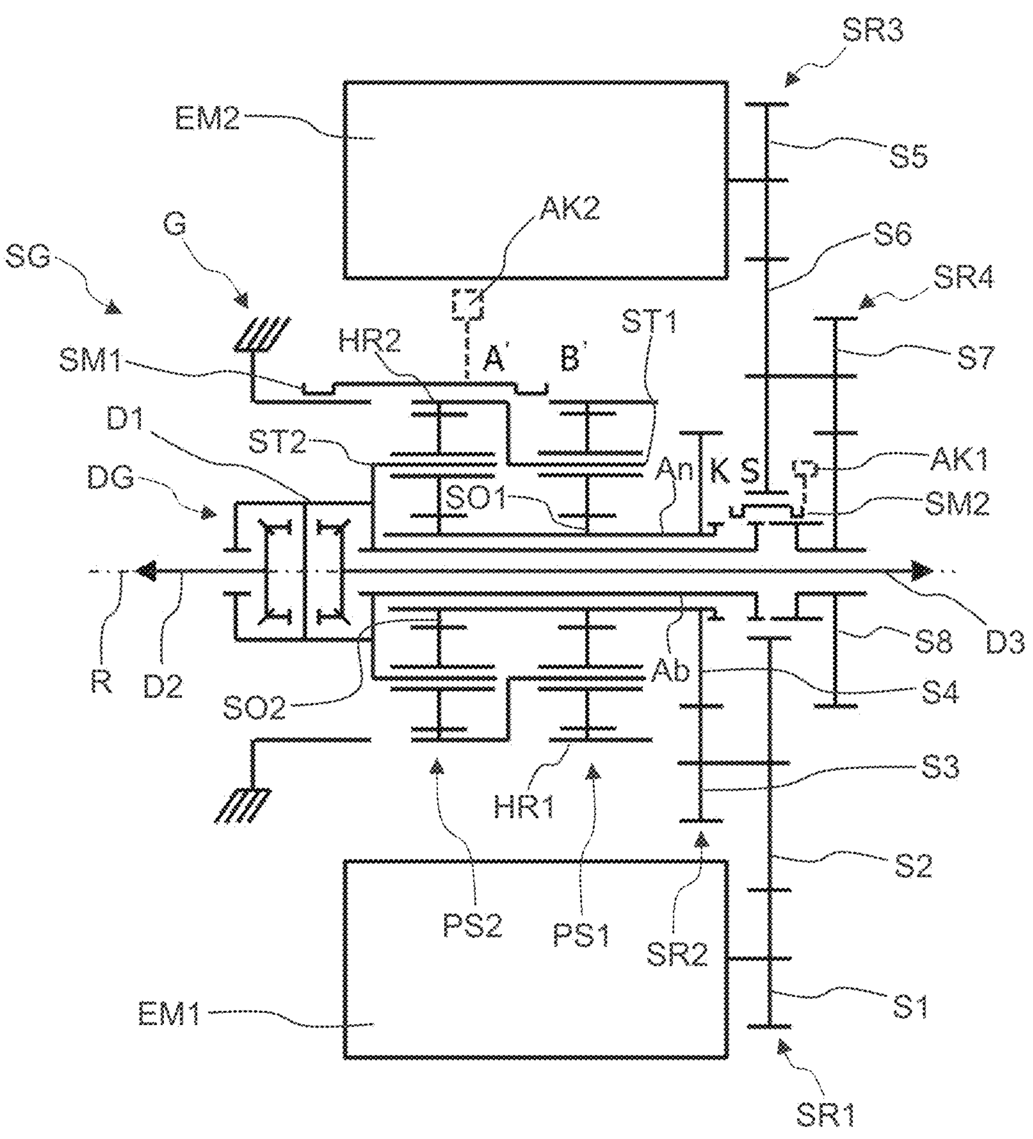
FIG. 3: a highly abstract schematic view of a drive unit according to the invention according to a second embodiment.

FIG. 3 shows a second embodiment of the drive unit according to the invention. The drive unit according to FIG. 3 is essentially the same as the drive unit according to FIG. 2, wherein the difference between these two embodiments lies in the design of the manual gearbox SG. In the present case, the manual gearbox SG has a third shift element A' and a fourth shift element B', which are combined in a second shift unit. When the third shift element A' is in a closed state, the second hollow gear shaft HR2 and the first web shaft ST1 are connected to a stationary component designed as a housing G in a rotationally fixed manner. When the fourth shift element B' is in a closed state, the first hollow gear shaft HR1 is connected to the stationary component designed as a housing G in a rotationally fixed manner. Consequently, the fourth shift element B' according to FIG. 3 corresponds to the third shift element B according to FIG. 2. As in the embodiment according to FIG. 2, the second electrical machine EM2 can drive directly onto the output shaft Ab independently of the first electrical machine EM1 when the second shift element S is closed. This transmission ratio is lower than the first gear that is present when the third shift element A' is closed and corresponds exactly to the second gear according to the embodiment in FIG. 2. Consequently, this transmission ratio is only available for the second electrical machine EM2. Thus, three gears are available for the second electrical machine EM2. Otherwise, the exemplary embodiment according to FIG. 3 corresponds to the exemplary embodiment according to FIG. 2, to which reference is made.

Figure 4:
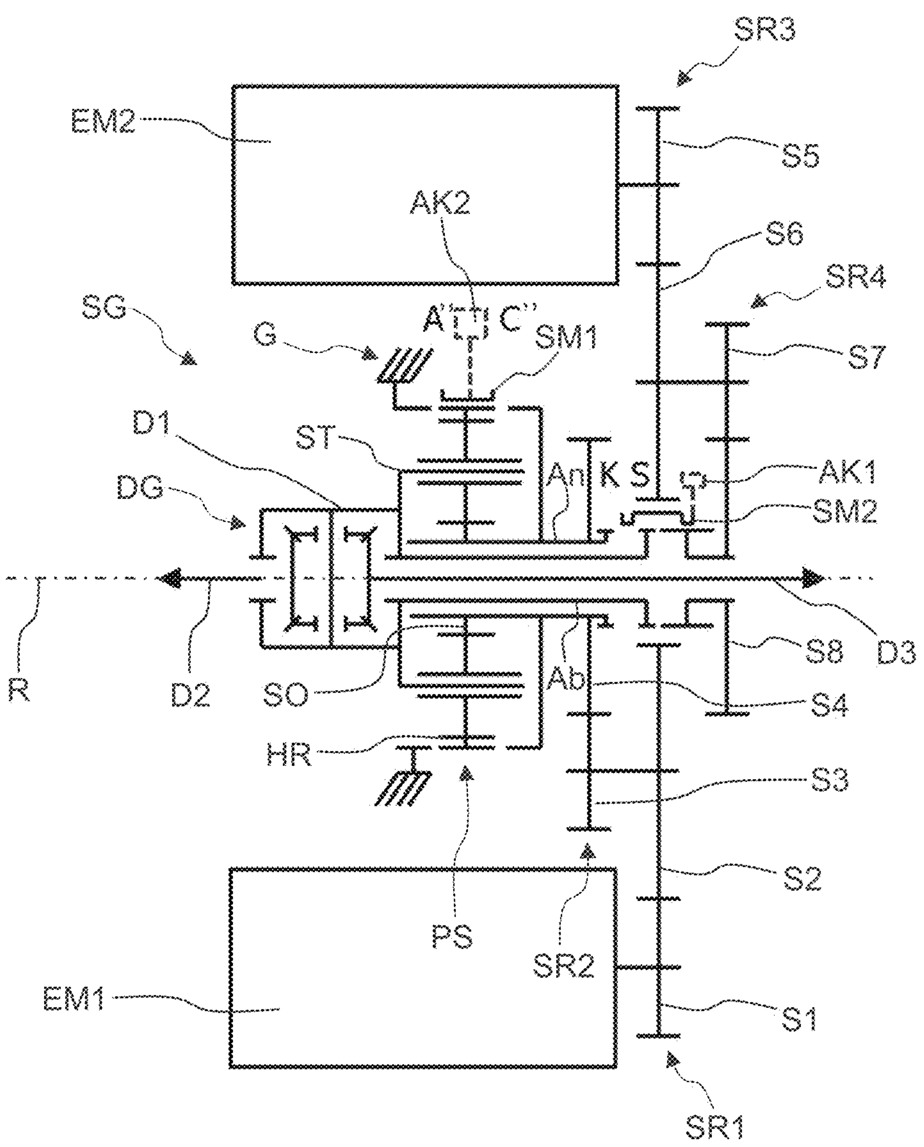
FIG. 4: a highly abstract schematic view of a drive unit according to the invention in accordance with a third embodiment.

FIG. 4 shows a third embodiment of the drive unit according to the invention. The drive unit according to FIG. 4 is essentially the same as the drive unit according to FIG. 2, wherein the difference between these two embodiments lies in the design of the manual gearbox SG. In the present case, the manual gearbox SG has a planetary gear set PS with a sun shaft SO, a hollow gear shaft HR and a web shaft ST, as well as a third shift element A" and a fourth shift element C", wherein the third shift element A" and the fourth shift element C" are combined in a second shift unit. The sun shaft SO and the drive shaft An are connected in a rotationally fixed manner. The web shaft ST and the output shaft Ab are connected in a rotationally fixed manner. In a closed state of the third shift element A", the hollow gear shaft HR is connected in a rotationally fixed manner to a stationary component designed as a housing G. Consequently, the third shift element A" according to FIG. 4 corresponds to the third shift element A' according to FIG. 3. When the fourth shift element C" is in a closed state, the hollow gear shaft HR, the sun shaft SO and the drive shaft An are connected in a rotationally fixed manner. Consequently, the fourth shift element C" according to FIG. 4 corresponds to the fourth shift element C according to FIG. 2. However, this is a blocking variant. Thus, in this embodiment, there are also two gears for the first electrical machine EM1 that can be switched using the second shift unit: a first gear when the third shift element A" is closed, and a second gear when the fourth shift element C" is closed. The fourth shift element C" locks the planetary gear set PS by connecting the hollow gear shaft HR to the sun shaft SO. As in the exemplary embodiment according to FIG. 2, the second electrical machine EM2 can drive directly onto the output shaft Ab independently of the first electrical machine EM1 when the second shift element S is closed, wherein the transmission ratio then corresponds to the transmission ratio in second gear. Otherwise, the exemplary embodiment according to FIG. 4 corresponds to the exemplary embodiment according to FIG. 2, to which reference is made.

Figure 5:
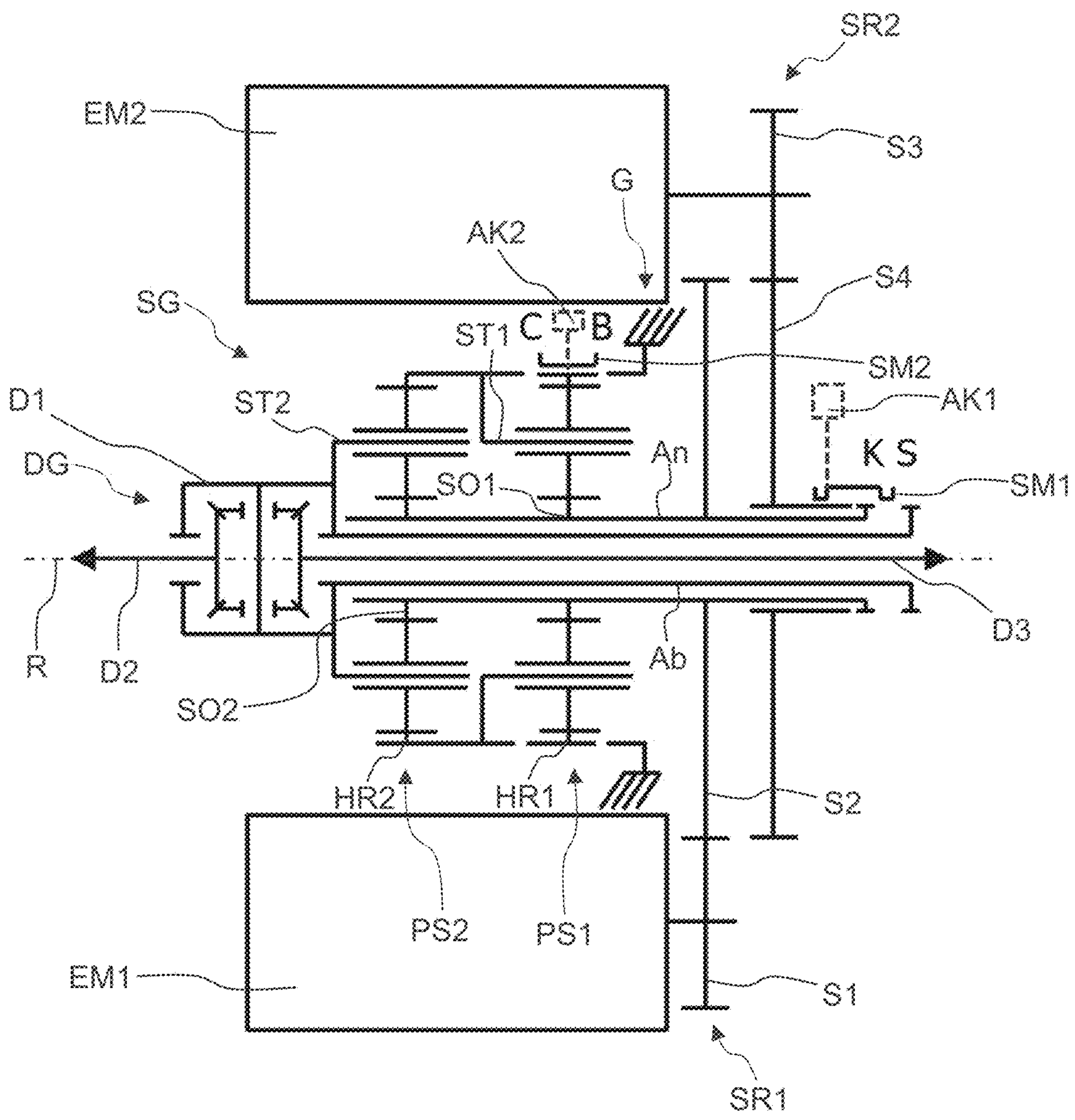
FIG. 5: a highly abstract schematic view of a drive unit according to the invention according to a fourth embodiment.

FIG. 5 shows a fourth embodiment of the drive unit according to the invention. The drive unit according to FIG. 5 essentially corresponds to the drive unit according to FIG. 2, wherein the difference between these two embodiments lies in the connection of the two electrical machines EM1, EM2. In the present case, the first electrical machine EM1 is connected to the drive shaft An via a first spur gear stage SR1, wherein the second electrical machine EM2 can be connected to the drive shaft An or to the output shaft Ab via a second spur gear stage SR2, depending on whether the first or second shift element K, S is closed. The first spur gear stage SR1 has a first spur gear S1 and a second spur gear S2, which engage in a tooth mesh with each other. The first spur gear S1 is connected in a rotationally fixed manner to a rotor shaft of the first electrical machine EM1, wherein the second spur gear S2 is connected to the drive shaft An in a rotationally fixed manner. Furthermore, the second spur gear stage SR2 has a third spur gear S3 and a fourth spur gear S4, which are engaged in a tooth mesh with each other. In the present case, the third spur gear S3 is connected in a rotationally fixed manner to a rotor shaft of the second electrical machine EM2, wherein the fourth spur gear S4 can be connected in a rotationally fixed manner to the drive shaft An or to the output shaft Ab via the first shift unit. When the first shift element K is closed, the fourth spur gear S4 is connected to the drive shaft An in a rotationally fixed manner. When the second shift element S is closed, the fourth spur gear S4 is connected to the output shaft Ab in a rotationally fixed manner. According to an axial sequence, the second planetary gear set PS2 is arranged axially adjacent to the differential DG, wherein the first planetary gear set PS1 is arranged axially adjacent to the second planetary gear set PS2, wherein the first spur gear stage SR1 is arranged axially adjacent to the first planetary gear set PS1, wherein the second spur gear stage SR2 is arranged axially adjacent to the first spur gear stage SR1, wherein the first shift unit is arranged axially adjacent to the second spur gear stage SR2. Otherwise, the exemplary embodiment according to FIG. 5 corresponds to the exemplary embodiment according to FIG. 2, to which reference is made.

Figure 6:
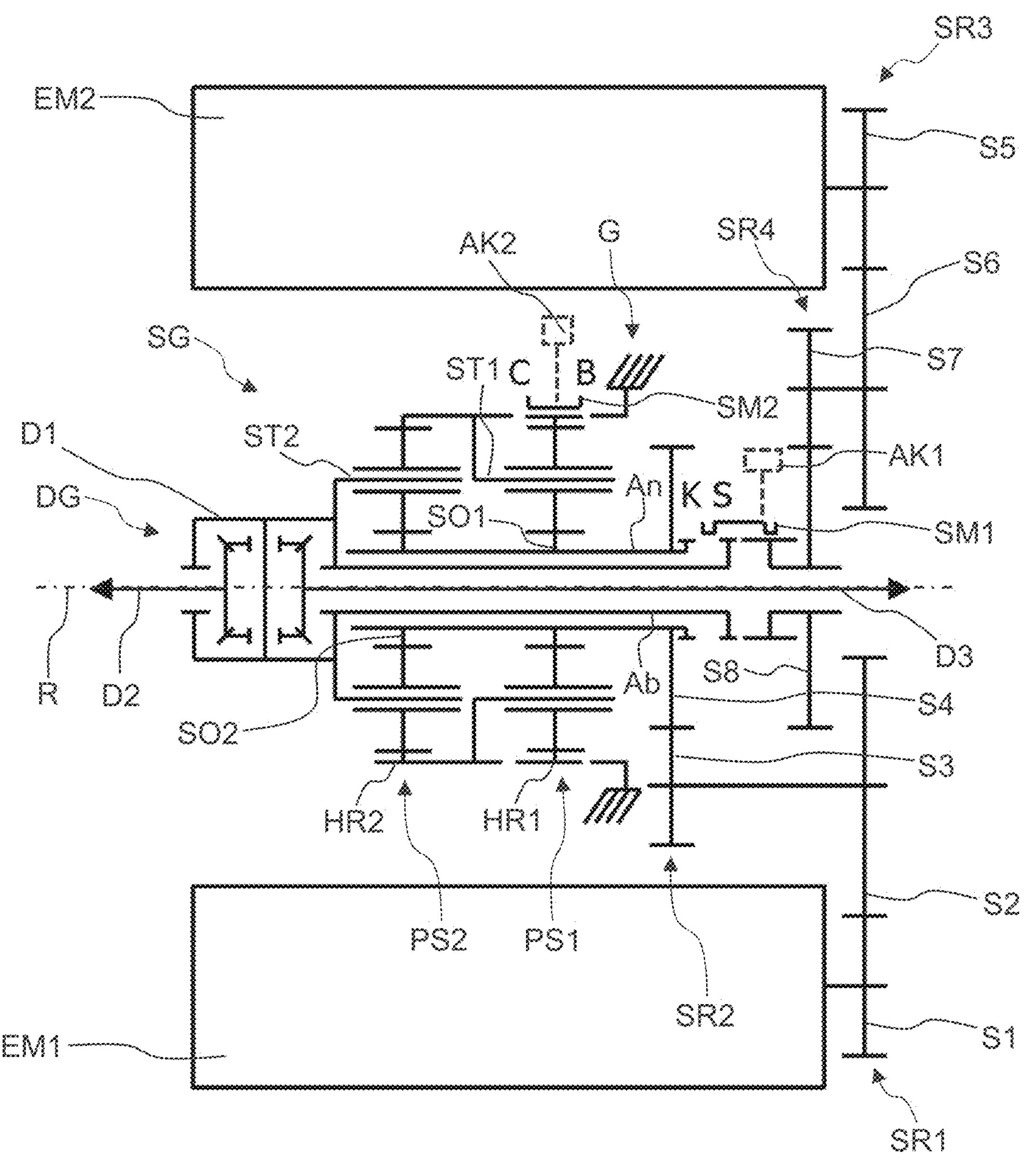
FIG. 6: a highly abstract schematic view of a drive unit according to the invention according to a fifth embodiment.

FIG. 6 shows a fifth embodiment of the drive unit according to the invention. The drive unit according to FIG. 6 is essentially the same as the drive unit according to FIG. 2, wherein the difference between these two embodiments in the arrangement of the first shift unit and the spur gear stages. In this case, the first shift unit is not radially stacked with the first and third spur gear stages SR1, SR3, but is arranged axially between the second and fourth spur gear stages SR2, SR4. In particular, the first and third spur gear stages, SR1 and SR3, are arranged in the same axial plane. This reduces the number of spur gear levels next to the two electrical machines EM1, EM2, so that there is more axial space for the electrical machines EM1, EM2. According to an axial sequence, the second planetary gear set PS2 is arranged axially adjacent to the differential DG, wherein the first planetary gear set PS1 is arranged axially adjacent to the second planetary gear set PS2, wherein the second spur gear stage SR2 is arranged axially adjacent to the first planetary gear set PS1, wherein the first shift unit is arranged axially adjacent to the second spur gear stage SR2, wherein the fourth spur gear stage SR4 is arranged axially adjacent to the first shift unit, wherein the first and third spur gear stages are arranged in a common axial plane adjacent to the fourth spur gear stage SR4. Otherwise, the exemplary embodiment according to FIG. 6 corresponds to the exemplary embodiment according to FIG. 2, to which reference is made.

Figure 7:
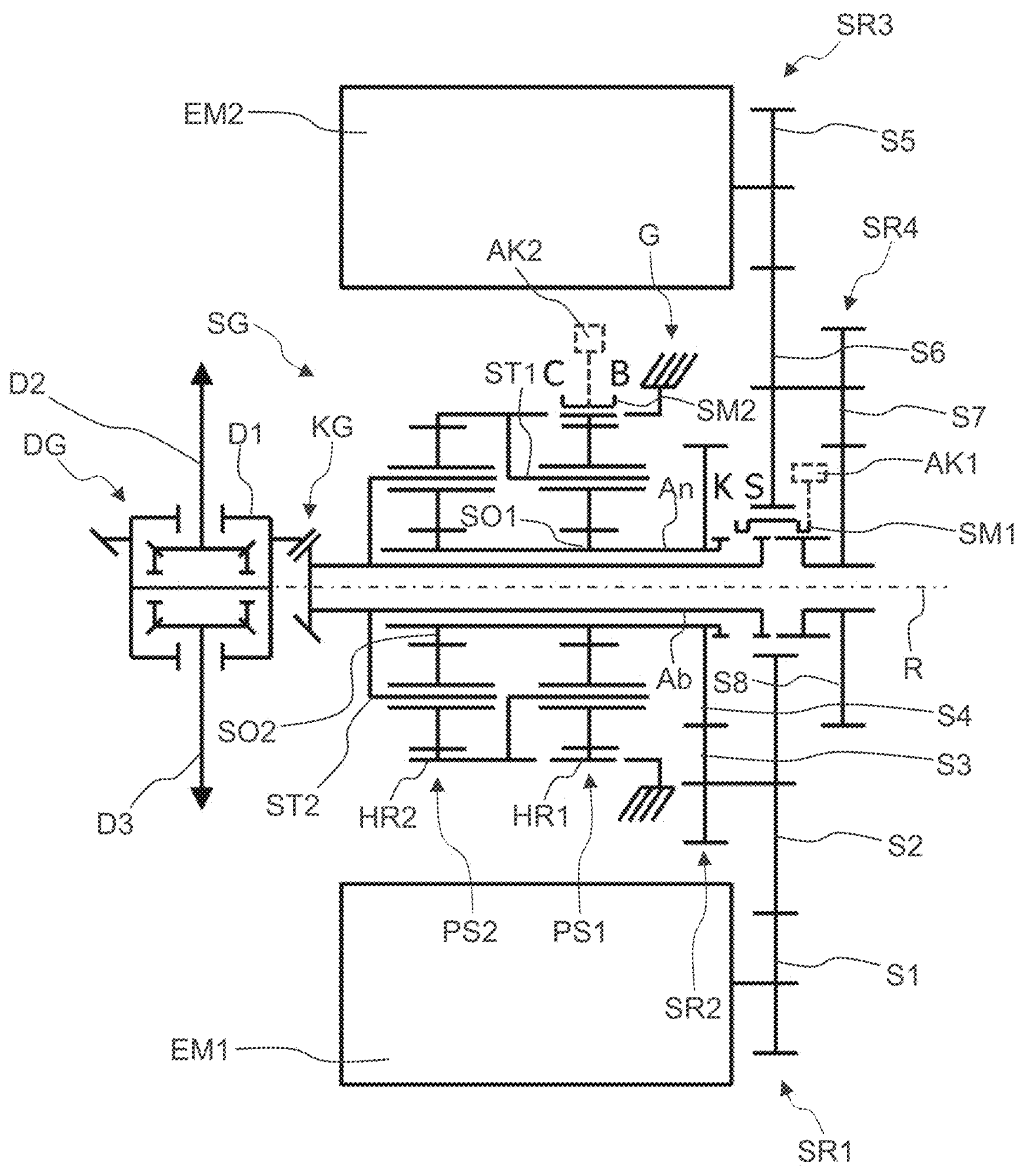
FIG. 7: a highly abstract schematic view of a drive unit according to the invention according to a sixth embodiment.

FIG. 7 shows a sixth embodiment of the drive unit according to the invention. The drive unit according to FIG. 7 essentially corresponds to the drive unit according to FIG. 2, wherein the difference between these two embodiments consists in the arrangement and connection of the differential DG. In the present case, the differential DG is connected to the output shaft Ab via a bevel gear stage KG and is thus arranged transversely to the manual gearbox SG. As in the embodiment according to FIG. 2, the differential DG is also designed as a ball or bevel gear differential and has a differential input shaft D1 and two differential output shafts D2, D3. The differential input shaft D1 is designed as a differential cage and is connected in a rotationally fixed manner to a bevel gear of the bevel gear stage KG, wherein the other bevel gear of the bevel gear stage KG is connected in a rotationally fixed manner to the output shaft Ab, and wherein the two bevel gears engage in a tooth mesh. The manual gearbox SG is arranged in the longitudinal direction of the vehicle, wherein the differential DG is arranged in the transverse direction of the vehicle. The output shaft Ab does not have to be designed as a hollow shaft and can in particular be designed as a solid shaft, since the second differential output shaft D3 does not pass through it. Otherwise, the exemplary embodiment according to FIG. 7 corresponds to the exemplary embodiment according to FIG. 2, to which reference is made.

Figure 8:
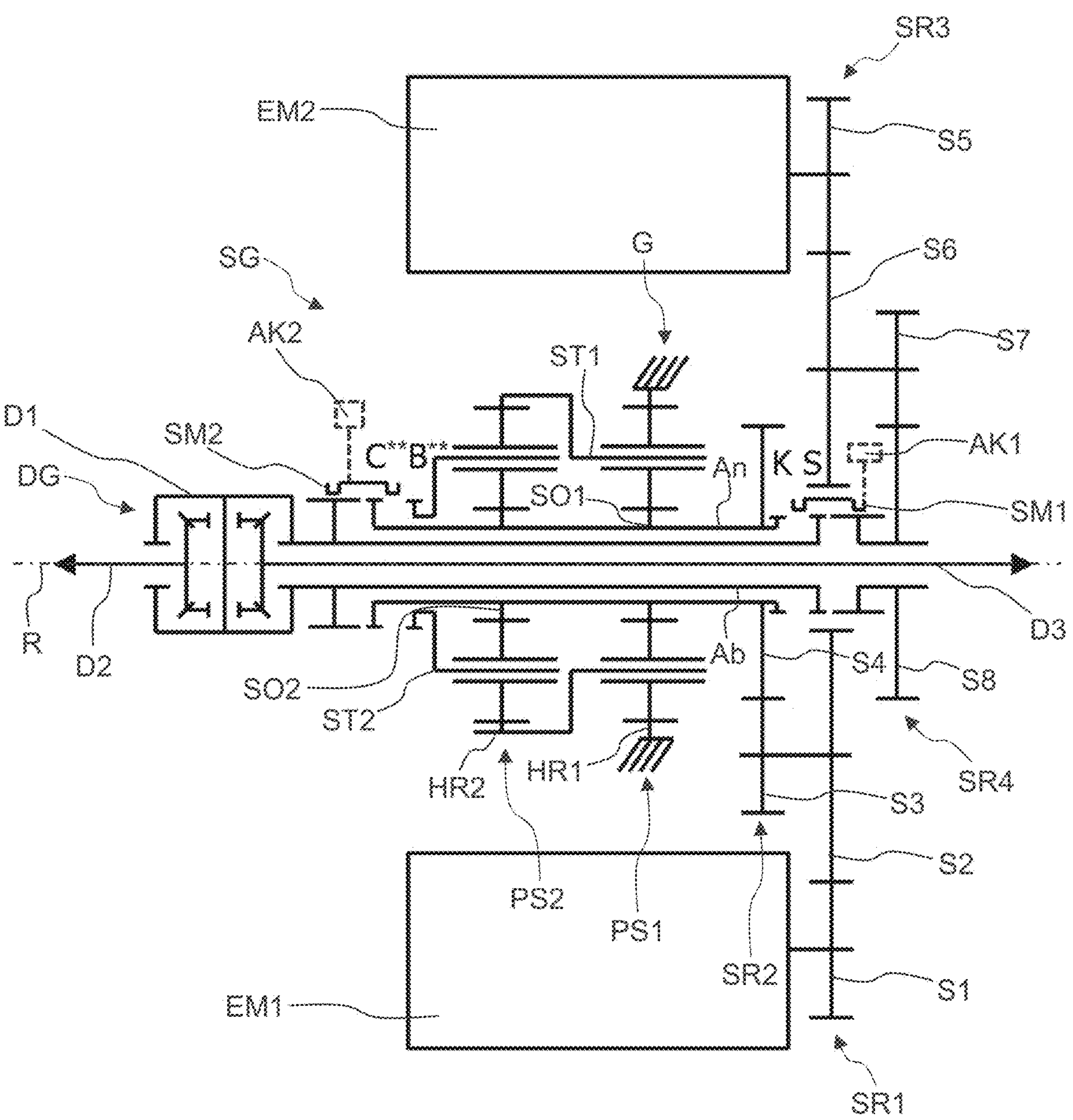
FIG. 8: a highly abstract schematic view of a drive unit according to the invention according to a seventh embodiment.

FIG. 8 shows a seventh embodiment of the drive unit according to the invention. The drive unit according to FIG. 8 essentially corresponds to the drive unit according to FIG. 2, wherein there is a difference between these two embodiments in the connection of the two planetary gear sets PS1, PS2 and in the arrangement of the second shift unit. In the present case, the second shift unit has a third shift element B and a fourth shift element C and is arranged axially between the differential DG and the second planetary gear set PS2. The first sun shaft SO1, the second sun shaft SO2 and the drive shaft An are connected in a rotationally fixed manner. The first web shaft ST1 and the second hollow gear shaft HR2 are connected in a rotationally fixed manner. The first hollow gear shaft HR1 is connected to a stationary component designed as housing G in a rotationally fixed manner. When the third shift element B is in a closed state, the second web shaft ST2 and the output shaft Ab are connected in a rotationally fixed manner. When the fourth shift element C is in a closed state, the first sun shaft SO1, the second sun shaft SO2, the drive shaft An and the output shaft Ab are connected in a rotationally fixed manner. The advantage is that in the neutral position of the second sliding sleeve SM2, both planetary gear sets PS1, PS2 and the first electrical machine EM1 can be decoupled from the output. The second electrical machine EM2 can then drive the vehicle alone via the second shift element S. Otherwise, the exemplary embodiment according to FIG. 8 corresponds to the exemplary embodiment according to FIG. 2, to which reference is made.

Figure 9:
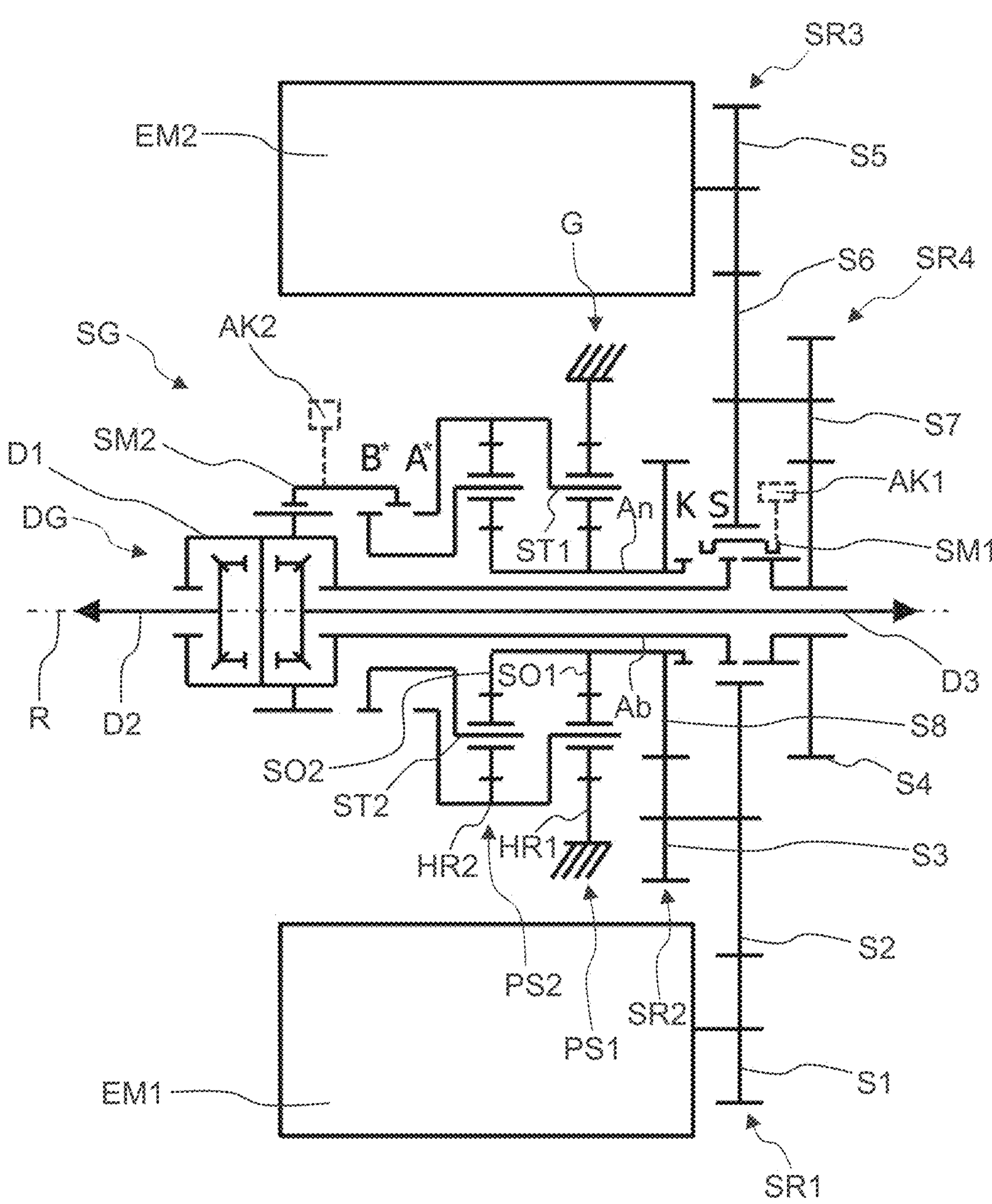
FIG. 9: a highly abstract schematic view of a drive unit according to the invention according to an eighth embodiment.

FIG. 9 shows an eighth embodiment of the drive unit according to the invention. The drive unit according to FIG. 9 essentially corresponds to the drive unit according to FIG. 3, wherein there is a difference between these two embodiments in the connection of the two planetary gear sets PS1, PS2 and in the arrangement of the second shift unit. In the present case, the second shift unit has a third shift element A* and a fourth shift element B* and is arranged axially between the differential DG and the second planetary gear set PS2. The first sun shaft SO1, the second sun shaft SO2 and the drive shaft An are connected in a rotationally fixed manner. The first web shaft ST1 and the second hollow gear shaft HR2 are connected in a rotationally fixed manner. The first hollow gear shaft HR1 is connected to a stationary component designed as housing G in a rotationally fixed manner. When the third shift element A* is in a closed state, the first web shaft ST1, the second hollow gear shaft HR2 and the output shaft Ab are connected in a rotationally fixed manner. When the fourth shift element B* is in the closed position, the second web shaft ST2 and the output shaft Ab are connected in a rotationally fixed manner. The advantage is that in the neutral position of the second sliding sleeve SM2, both planetary gear sets PS1, PS2 and the first electrical machine EM1 can be decoupled from the output. The second electrical machine EM2 can then drive the vehicle alone via the second shift element S. The second shift unit is arranged axially between the differential DG and the second planetary gear set PS2. In particular, the second shift unit is at least partially radially nested with the DG differential, which increases the compactness. Otherwise, the exemplary embodiment according to FIG. 9 corresponds to the exemplary embodiment according to FIG. 3, to which reference is made.

Figure 10:
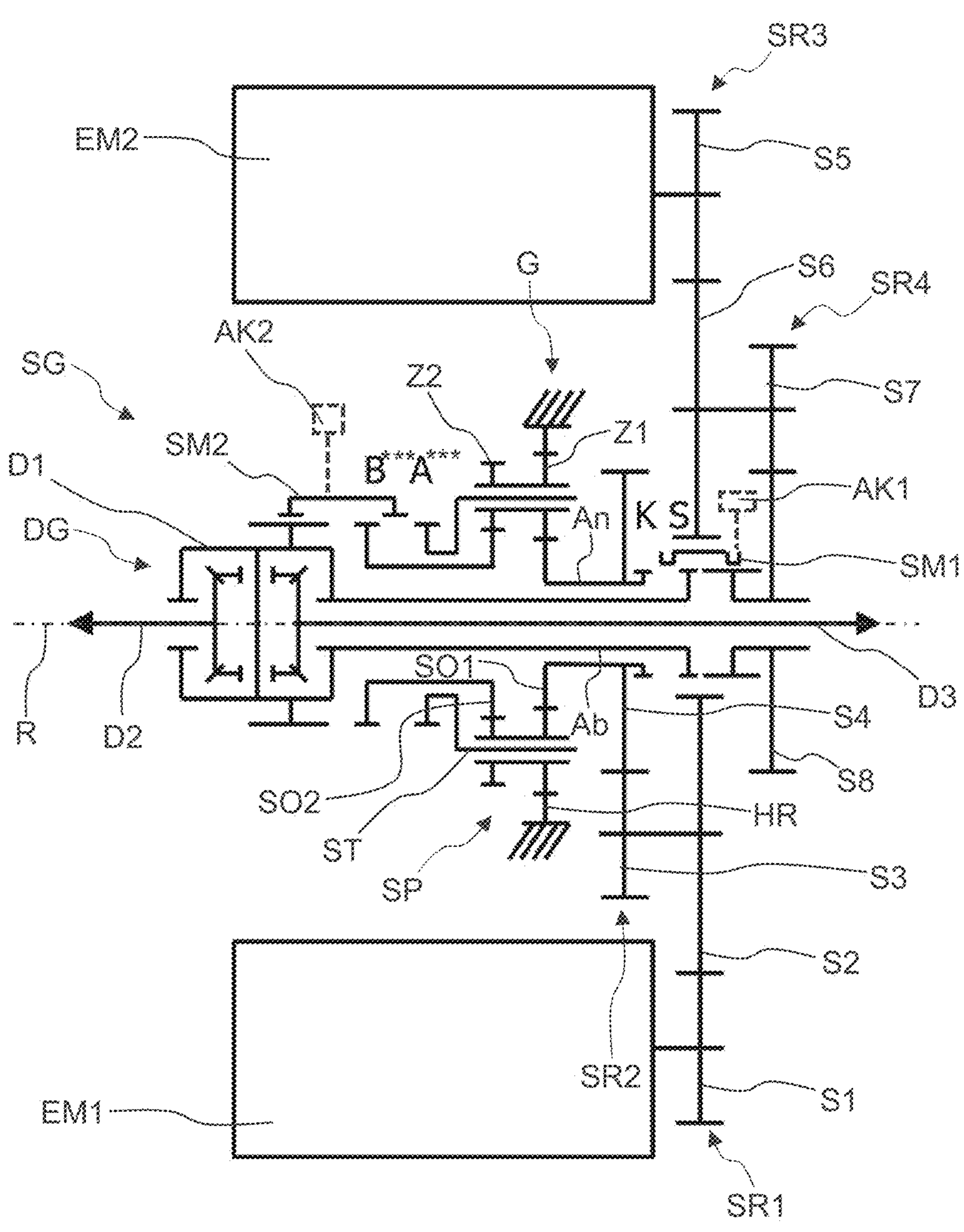
FIG. 10: a highly abstract schematic view of a drive unit according to the invention according to a ninth embodiment.

FIG. 10 shows a ninth embodiment of the drive unit according to the invention. The drive unit according to FIG. 10 is essentially the same as the drive unit according to FIG. 2, wherein the difference between these two embodiments lies in the design of the manual gearbox SG. In the present case, the manual gearbox has a stepped planetary gear set SP with a first sun shaft SO1, a second sun shaft SO2, a hollow gear shaft HR and a web shaft ST with a plurality of stepped planetary gears, each of which has a first and a second gear wheel Z1, Z2 connected in a rotationally fixed manner, as well as a third shift element A* and a fourth shift element B*. The first gear wheel Z1 is in tooth mesh with the first sun shaft SO1 and the hollow gear shaft HR, wherein the second gear wheel Z2 is in tooth mesh with the second sun shaft SO2. The first sun shaft SO1 and the drive shaft An are connected in a rotationally fixed manner. The hollow gear shaft HR is connected in a rotationally fixed manner to a stationary component designed as a housing G. When the third shift element A* is in a closed state, the web shaft ST and the output shaft Ab are connected in a rotationally fixed manner. When the fourth shift element B* is in a closed state, the second sun shaft SO2 and the output shaft Ab are connected in a rotationally fixed manner. The second shift unit is arranged axially between the differential DG and the stepped planetary gear set SP. In particular, the second shift unit is at least partially radially nested with the differential DG, thereby increasing the compactness. Otherwise, the exemplary embodiment according to FIG. 10 corresponds to the exemplary embodiment according to FIG. 2, to which reference is made.

REFERENCE NUMBERS

100 Vehicle
101 First axle
102 Second axle
R1 Vehicle wheel
R2 Vehicle wheel
R3 Vehicle wheel
R4 Vehicle wheel
An Drive shaft
Ab Output shaft
SG Manual gearbox
EM1 First electrical machine
EM2 Second electrical machine
ST1 First spur gear stage
ST2 Second spur gear stage
ST3 Third spur gear stage
ST4 Fourth spur gear stage
S1 First spur gear
S2 Further spur gear
S3 Third spur gear
S4 Fourth spur gear
S5 Fifth spur gear
S6 Sixth spur gear
S7 Seventh spur gear
S8 Eighth spur gear
SP Stepped planetary gear set
Z1 First gear wheel
Z2 Second gear wheel
PS1 First planetary gear set
SO1 First sun shaft
HO1 First hollow gear shaft
ST First web shaft
PS2 Second planetary gear set
SO2 Second sun shaft
HO2 Second hollow gear shaft
ST2 Second web shaft
PS3 Planetary gear set
SO3 Sun shaft
HO3 Hollow gear shaft
ST3 Web shaft
AK1 First actuator
AK2 Second actuator
SM1 First sliding sleeve
SM2 Second sliding sleeve
G Housing
R Axis of rotation
KG Bevel gear stage
DG Differential
D1 Differential input shaft
D2 First differential output shaft
D3 Second differential output shaft
K First shift element
S Second shift element
B, A', A", A*, B, A* Third shift element
C, B', C", B*, C, B* Fourth shift element

The invention claimed is:

1. A drive unit for a vehicle, comprising:
a first electrical machine;
a second electrical machine arranged axially parallel to the first electrical machine;
a manual gearbox with a plurality of gears, the manual gearbox arranged axially parallel to the first and second electrical machines;
a differential with one differential input shaft, a first differential output shaft and a second differential output shaft;
a drive shaft configured for connecting the first electrical machine to the manual gearbox;
an output shaft configured for connecting the manual gearbox to the differential;
a first positive-locking shift unit having a first shift element, a second shift element, and a first sliding sleeve which is displaceable by means of a first actuator into a respective one of three shift positions; and
a first spur gear stage and a second spur gear stage, wherein the first electrical machine is connected to the drive shaft via the first spur gear stage, and wherein the second electrical machine is configured to be connected to the drive shaft or to the output shaft via the second spur gear stage;
wherein, in a first shift position of the first sliding sleeve, the first shift element is closed and the second electrical machine is connected to the drive shaft with an actuating effect;
wherein, in a second shift position of the first sliding sleeve, both shift elements are open and the second electrical machine is decoupled from the manual gearbox;
wherein in a third shift position of the first sliding sleeve the second shift element is closed and the second electrical machine is connected to the output shaft with an actuating effect;
wherein the drive shaft is configured as a hollow shaft and the output shaft is arranged within the drive shaft.

2. The drive unit according to claim 1, wherein the manual gearbox has a first planetary gear set with a first sun shaft, a first hollow gear shaft, and a first web shaft, and has a second planetary gear set with a second sun shaft, a second hollow gear shaft, and a second web shaft, wherein the first sun shaft, the second sun shaft and the drive shaft are connected in a rotationally fixed manner, wherein the first web shaft and the second hollow gear shaft are connected in a rotationally fixed manner, and wherein the second web shaft and the output shaft are connected in a rotationally fixed manner.

3. The drive unit according to claim 1, wherein the manual gearbox has a planetary gear set with a sun shaft, a hollow gear shaft, and a web shaft, as well as a third shift element and a fourth shift element;

wherein the sun shaft and the drive shaft are connected in a rotationally fixed manner, wherein the web shaft and the output shaft are connected in a rotationally fixed manner, wherein, in a closed state of the third shift element, the hollow gear shaft is connected in a rotationally fixed manner to a stationary component; and wherein, in a closed state of the fourth shift element, the hollow gear shaft, the sun shaft and the drive shaft are connected in a rotationally fixed manner.

4. The drive unit according to claim 1, wherein the manual gearbox comprises:

a first planetary gear set having a first sun shaft, a first hollow gear shaft, and a first web shaft;

a second planetary gear set having a second sun shaft, a second hollow gear shaft, and a second web shaft; and a third shift element; and a fourth shift element);

wherein the first sun shaft, the second sun shaft, and the drive shaft are connected in a rotationally fixed manner;

wherein the first web shaft and the second hollow gear shaft are connected in a rotationally fixed manner;

wherein the first hollow gear shaft is connected in a rotationally fixed manner to a stationary component;

wherein, in a closed state of the third shift element, the second web shaft and the output shaft are connected in a rotationally fixed manner; and wherein, in a closed state of the fourth shift element, the first sun shaft, the second sun shaft, the drive shaft, and the output shaft are connected in a rotationally fixed manner.

5. The drive unit according to claim 1, wherein the manual gearbox comprises:

a first planetary gear set having a first sun shaft, a first hollow gear shaft, and a first web shaft;

a second planetary gear set having a second sun shaft, a second hollow gear shaft, and a second web shaft;

a third shift element; and a fourth shift element;

wherein the first sun shaft, the second sun shaft, and the drive shaft are connected in a rotationally fixed manner;

wherein the first web shaft and the second hollow gear shaft are connected in a rotationally fixed manner;

wherein the first hollow gear shaft is connected in a rotationally fixed manner to a stationary component;

wherein in a closed state of the third shift element, the first web shaft, the second hollow gear shaft, and the output shaft are connected in a rotationally fixed manner; and wherein, in a closed state of the fourth shift element, the second web shaft, and the output shaft are connected in a rotationally fixed manner.

6. The drive unit according to claim 1, wherein the manual gearbox comprises:

a stepped planetary gear set with a first sun shaft, a second sun shaft, a hollow gear shaft, and a web shaft having a plurality of stepped planet gears, which each have a first and a second gear wheel connected in a rotationally fixed manner;

a third shift element; and a fourth shift element;

wherein the first gear wheel engages in a tooth mesh with the first sun shaft and the ring gear shaft;

wherein the second gear wheel engages in a tooth mesh with the second sun shaft;

wherein the first sun shaft and the drive shaft are connected in a rotationally fixed manner;

wherein the hollow gear shaft is connected in a rotationally fixed manner to a stationary component;

wherein, in a closed state of the third shift element, the web shaft and the output shaft are connected in a rotationally fixed manner; and wherein, in a closed state of the fourth shift element, the second sun shaft and the output shaft are connected in a rotationally fixed manner.

7. The drive unit according to claim 1, wherein the differential is arranged coaxially with the manual gearbox and the second differential output shaft is guided axially through the output shaft.

8. The drive unit according to claim 1, wherein the differential is arranged transversely to the manual gearbox and the differential input shaft is connected to the output shaft via a bevel gear stage.

9. A vehicle comprising at least one drive unit according to claim 1.

10. A drive unit for a vehicle, comprising:

a first electrical machine;

a second electrical machine arranged axially parallel to the first electrical machine;

a manual gearbox with a plurality of gears, the manual gearbox arranged axially parallel to the first and second electrical machines;

a differential with one differential input shaft, a first differential output shaft and a second differential output shaft;

a drive shaft configured for connecting the first electrical machine to the manual gearbox;

an output shaft configured for connecting the manual gearbox to the differential;

a first positive-locking shift unit having a first shift element, a second shift element, and a first sliding sleeve which is displaceable by means of a first actuator into a respective one of three shift positions; and a first spur gear stage, a second spur gear stage, a third spur gear stage, and a fourth spur gear stage, wherein the first electrical machine is connected to the drive shaft via the first spur gear stage and the second spur gear stage, and wherein the second electrical machine is configured to be connected to the drive shaft or to the output shaft via the third spur gear stage and the fourth spur gear stage, wherein, in a first shift position of the first sliding sleeve, the first shift element is closed and the second electrical machine is connected to the drive shaft with an actuating effect;

wherein, in a second shift position of the first sliding sleeve, both shift elements are open and the second electrical machine is decoupled from the manual gearbox;

wherein in a third shift position of the first sliding sleeve the second shift element is closed and the second electrical machine is connected to the output shaft with an actuating effect;

wherein the drive shaft is configured as a hollow shaft and the output shaft is arranged within the drive shaft.

11. The drive unit according to claim 10, wherein the first shift unit is arranged radially nested with the first spur gear stage and the third spur gear stage.

12. The drive unit according to claim 10, wherein the manual gearbox has a first planetary gear set with a first sun shaft, a first hollow gear shaft, and a first web shaft, and has a second planetary gear set with a second sun shaft, a second hollow gear shaft, and a second web shaft, wherein the first sun shaft, the second sun shaft and the drive shaft are connected in a rotationally fixed manner, wherein the first web shaft and the second hollow gear shaft are connected in a rotationally fixed manner, and wherein the second web shaft and the output shaft are connected in a rotationally fixed manner.

13. The drive unit according to claim 10, wherein the manual gearbox has a planetary gear set with a sun shaft, a hollow gear shaft, and a web shaft, as well as a third shift element and a fourth shift element;

wherein the sun shaft and the drive shaft are connected in a rotationally fixed manner, wherein the web shaft and the output shaft are connected in a rotationally fixed manner, wherein, in a closed state of the third shift element, the hollow gear shaft is connected in a rotationally fixed manner to a stationary component; and wherein, in a closed state of the fourth shift element, the hollow gear shaft, the sun shaft and the drive shaft are connected in a rotationally fixed manner.

14. The drive unit according to claim 10, wherein the manual gearbox comprises:

a first planetary gear set having a first sun shaft, a first hollow gear shaft, and a first web shaft;

a second planetary gear set having a second sun shaft, a second hollow gear shaft, and a second web shaft; and a third shift element; and a fourth shift element;

wherein the first sun shaft, the second sun shaft, and the drive shaft are connected in a rotationally fixed manner;

wherein the first web shaft and the second hollow gear shaft are connected in a rotationally fixed manner;

wherein the first hollow gear shaft is connected in a rotationally fixed manner to a stationary component;

wherein, in a closed state of the third shift element, the second web shaft and the output shaft are connected in a rotationally fixed manner; and wherein, in a closed state of the fourth shift element, the first sun shaft, the second sun shaft, the drive shaft, and the output shaft are connected in a rotationally fixed manner.

15. The drive unit according to claim 10, wherein the manual gearbox comprises:

a first planetary gear set having a first sun shaft, a first hollow gear shaft, and a first web shaft ;

a second planetary gear set having a second sun shaft, a second hollow gear shaft, and a second web shaft;

a third shift element; and a fourth shift element;

wherein the first sun shaft, the second sun shaft, and the drive shaft are connected in a rotationally fixed manner;

wherein the first web shaft and the second hollow gear shaft are connected in a rotationally fixed manner;

wherein the first hollow gear shaft is connected in a rotationally fixed manner to a stationary component;

wherein in a closed state of the third shift element, the first web shaft, the second hollow gear shaft, and the output shaft are connected in a rotationally fixed manner; and wherein, in a closed state of the fourth shift element, the second web shaft, and the output shaft are connected in a rotationally fixed manner.

16. The drive unit according to claim 10, wherein the manual gearbox comprises:

a stepped planetary gear set with a first sun shaft, a second sun shaft, a hollow gear shaft, and a web shaft having a plurality of stepped planet gears, which each have a first and a second gear wheel connected in a rotationally fixed manner;

a third shift element; and a fourth shift element;

wherein the first gear wheel engages in a tooth mesh with the first sun shaft and the ring gear shaft;

wherein the second gear wheel engages in a tooth mesh with the second sun shaft;

wherein the first sun shaft and the drive shaft are connected in a rotationally fixed manner;

wherein the hollow gear shaft is connected in a rotationally fixed manner to a stationary component;

wherein, in a closed state of the third shift element, the web shaft and the output shaft are connected in a rotationally fixed manner; and wherein, in a closed state of the fourth shift element, the second sun shaft and the output shaft are connected in a rotationally fixed manner.

17. The drive unit according to claim 10, wherein the differential is arranged coaxially with the manual gearbox and the second differential output shaft is guided axially through the output shaft.

18. The drive unit according to claim 10, wherein the differential is arranged transversely to the manual gearbox and the differential input shaft is connected to the output shaft via a bevel gear stage.

19. A vehicle comprising at least one drive unit according to claim 10.

20. A drive unit for a vehicle, comprising:

a first electrical machine;

a second electrical machine arranged axially parallel to the first electrical machine;

a manual gearbox with a plurality of gears, the manual gearbox arranged axially parallel to the first and second electrical machines;

a differential with one differential input shaft, a first differential output shaft and a second differential output shaft;

a drive shaft configured for connecting the first electrical machine to the manual gearbox;

an output shaft configured for connecting the manual gearbox to the differential; and a first positive-locking shift unit having a first shift element, a second shift element, and a first sliding sleeve which is displaceable by means of a first actuator into a respective one of three shift positions;

wherein, in a first shift position of the first sliding sleeve, the first shift element is closed and the second electrical machine is connected to the drive shaft with an actuating effect;

wherein, in a second shift position of the first sliding sleeve, both shift elements are open and the second electrical machine is decoupled from the manual gearbox;

wherein in a third shift position of the first sliding sleeve the second shift element is closed and the second electrical machine is connected to the output shaft with an actuating effect;

wherein the drive shaft is configured as a hollow shaft and the output shaft is arranged within the drive shaft and wherein the manual gearbox has a first planetary gear set with a first sun shaft, a first hollow gear shaft, and a first web shaft, and has a second planetary gear set with a second sun shaft, a second hollow gear shaft, and a second web shaft, wherein the first sun shaft, the second sun shaft, and the drive shaft are connected in a rotationally fixed manner, wherein the first web shaft and the second hollow gear shaft are connected in a rotationally fixed manner, and wherein the second web shaft and the output shaft are connected in a rotationally fixed manner.

* * * * *